(12) United States Patent
Amichai et al.

(10) Patent No.: US 10,146,667 B2
(45) Date of Patent: Dec. 4, 2018

(54) GENERALIZED SNAPSHOTS BASED ON MULTIPLE PARTIAL SNAPSHOTS

(71) Applicant: HEWLETT PACKARD ENTERPRISE DEVELOPMENT LP, Houston, TX (US)

(72) Inventors: Nitsan Amichai, Yehud (IL); Haim Shuvali, Yehud (IL); Michael Gopshtein, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 6 days.

(21) Appl. No.: 15/115,197

(22) PCT Filed: Apr. 10, 2014

(86) PCT No.: PCT/US2014/033600
§ 371 (c)(1),
(2) Date: Jul. 28, 2016

(87) PCT Pub. No.: WO2015/156809
PCT Pub. Date: Oct. 15, 2015

(65) Prior Publication Data
US 2016/0335174 A1   Nov. 17, 2016

(51) Int. Cl.
*G06T 7/38*   (2017.01)
*G06T 5/50*   (2006.01)
(Continued)

(52) U.S. Cl.
CPC .......... *G06F 11/3668* (2013.01); *G06F 11/30* (2013.01); *G06F 11/3664* (2013.01);
(Continued)

(58) Field of Classification Search
None
See application file for complete search history.

(56) References Cited

U.S. PATENT DOCUMENTS 6,646,680 B1   11/2003   Mead
7,019,773 B1 *  3/2006   Heath ............... H04N 5/262
                                              348/144
(Continued)

FOREIGN PATENT DOCUMENTS

WO   WO-9638319 A2   12/1996
WO   WO-9827456 A2    6/1998
(Continued)

OTHER PUBLICATIONS

International Search Report & Written Opinion received in PCT Application No. PCT/US2014/033597, dated Jan. 5, 2015, 9 pages.
(Continued)

*Primary Examiner* — Bernard Krasnic

(57) ABSTRACT

Example embodiments relate to generalized snapshots based on multiple partial snapshots. An example method may include accessing multiple partial snapshots, each from a different client. The method may include creating a generalized snapshot from the multiple partial snapshots. The generalized snapshot includes multiple target pixels, and the color of each of the multiple target pixels may be determined by considering colors of multiple source pixels, each from a different partial snapshot.

11 Claims, 5 Drawing Sheets

(51) Int. Cl.
| | | |
|---|---|---|
| *G06F 11/36* | (2006.01) | |
| *G06F 11/30* | (2006.01) | |
| *G06K 9/46* | (2006.01) | |
| *G06K 9/62* | (2006.01) | |
| *G06F 9/451* | (2018.01) | |
| *G06F 9/44* | (2018.01) | |

(52) U.S. Cl.
CPC ......... *G06K 9/4652* (2013.01); *G06K 9/6267* (2013.01); *G06T 5/50* (2013.01); *G06T 7/38* (2017.01); *G06F 9/4443* (2013.01); *G06F 9/451* (2018.02); *G06K 2209/03* (2013.01); *G06K 2209/27* (2013.01)

(56) References Cited

U.S. PATENT DOCUMENTS

| | | | |
|---|---|---|---|
| 8,452,814 | B1 | 5/2013 | Yin |
| 2004/0212797 | A1 | 10/2004 | Akiyama |
| 2005/0052551 | A1* | 3/2005 | Tsunoda ............. H04N 5/23293 348/231.6 |
| 2007/0198001 | A1* | 8/2007 | Bauch ................ G06F 19/3406 606/1 |
| 2009/0100096 | A1 | 4/2009 | Erlichson |
| 2009/0225224 | A1 | 9/2009 | Sung et al. |
| 2010/0079596 | A1 | 4/2010 | Qiu et al. |
| 2010/0208998 | A1 | 8/2010 | Van Droogenbroeck |
| 2010/0245388 | A1* | 9/2010 | Bauch ................ G06F 19/3406 345/634 |
| 2011/0214107 | A1 | 9/2011 | Barmeir et al. |
| 2012/0317549 | A1 | 12/2012 | Cunningham et al. |
| 2012/0330127 | A1* | 12/2012 | Aulbach .............. G06F 19/321 600/407 |
| 2013/0183951 | A1 | 7/2013 | Chienm |
| 2013/0219365 | A1 | 8/2013 | Rago et al. |
| 2013/0311653 | A1 | 11/2013 | Hernandez et al. |
| 2014/0095600 | A1* | 4/2014 | Needham ............... H04L 67/38 709/204 |
| 2014/0218385 | A1* | 8/2014 | Carmi ................... G09G 5/377 345/590 |
| 2014/0257595 | A1* | 9/2014 | Tillmann ............... G01C 11/02 701/2 |
| 2015/0007024 | A1* | 1/2015 | Jeong ................... G06F 17/211 715/277 |
| 2017/0006188 | A1* | 1/2017 | Amichai ............... G06F 11/366 |
| 2017/0053397 | A1 | 2/2017 | Chukka |

FOREIGN PATENT DOCUMENTS

| | | |
|---|---|---|
| WO | WO-2011073759 A1 | 6/2011 |
| WO | WO-2014041366 A2 | 3/2014 |
| WO | WO-2015156809 A1 | 10/2015 |

OTHER PUBLICATIONS

Appsee, "Optimize Your Users' Happiness," (Web Page), 2 pages, retrieved online on Mar. 20, 2014 at http://www.appsee.com/.

Cooley, J. et al., "Privacy-preserving Screen Capture: Towards Closing the Loop for Health It Usability," (Research Paper), Jul. 11, 2012, 13 pages, available at http://www.cs.dartmouth.edu/~sws/pubs/cs13.pdf.

GURU99, "Tree & Script View in LoadRunner," (Web Page), 1 page, retrieved online on Mar. 20, 2014 at http://www.guru99.com/loadrunner-tutorial-6.html.

Hewlett-Packard Development Company, L.P., "BPM Snapshot on Error," (Web Page), 2014, 2 pages, available at http://h30499.www3.hp.com/t5/Application-Perf-Mgmt-BAC-BSM/BPM-Snapshot-on-Error/td-p/5170294#.Usvp3fTeLlc.

Hewlett-Packard Development Company, L.P., "Real User Monitor Application Data Collection Page," (Web Page), 1 page, retrieved online on Mar. 20, 2014 at http://update.external.hp.com/HPSoftware/webhelp/bsm/Content/EUM/AdminGuide/rum_app_data_collection.htm.

International Search Report & Written Opinion received in PCT Application No. PCT/US2014/033600, dated Dec. 31, 2014, 9 pages.

* cited by examiner

GENERALIZED SNAPSHOTS BASED ON MULTIPLE PARTIAL SNAPSHOTS

BACKGROUND

Applications (e.g., computer software) often include a user interface (UI) component that displays screens to users of the application. A snapshot of an application refers to a screen capture of part or all of the screen presented to the user. Snapshots may be captured by various tools (e.g., testing tools for mobile or web applications) at various times and/or in response to various events (e.g., user actions). A snapshot may be an image file, digital file or some other type of binary data that includes a number of color pixels.

BRIEF DESCRIPTION OF THE DRAWINGS

The following detailed description references the drawings, wherein.

DETAILED DESCRIPTION

Figure 1:
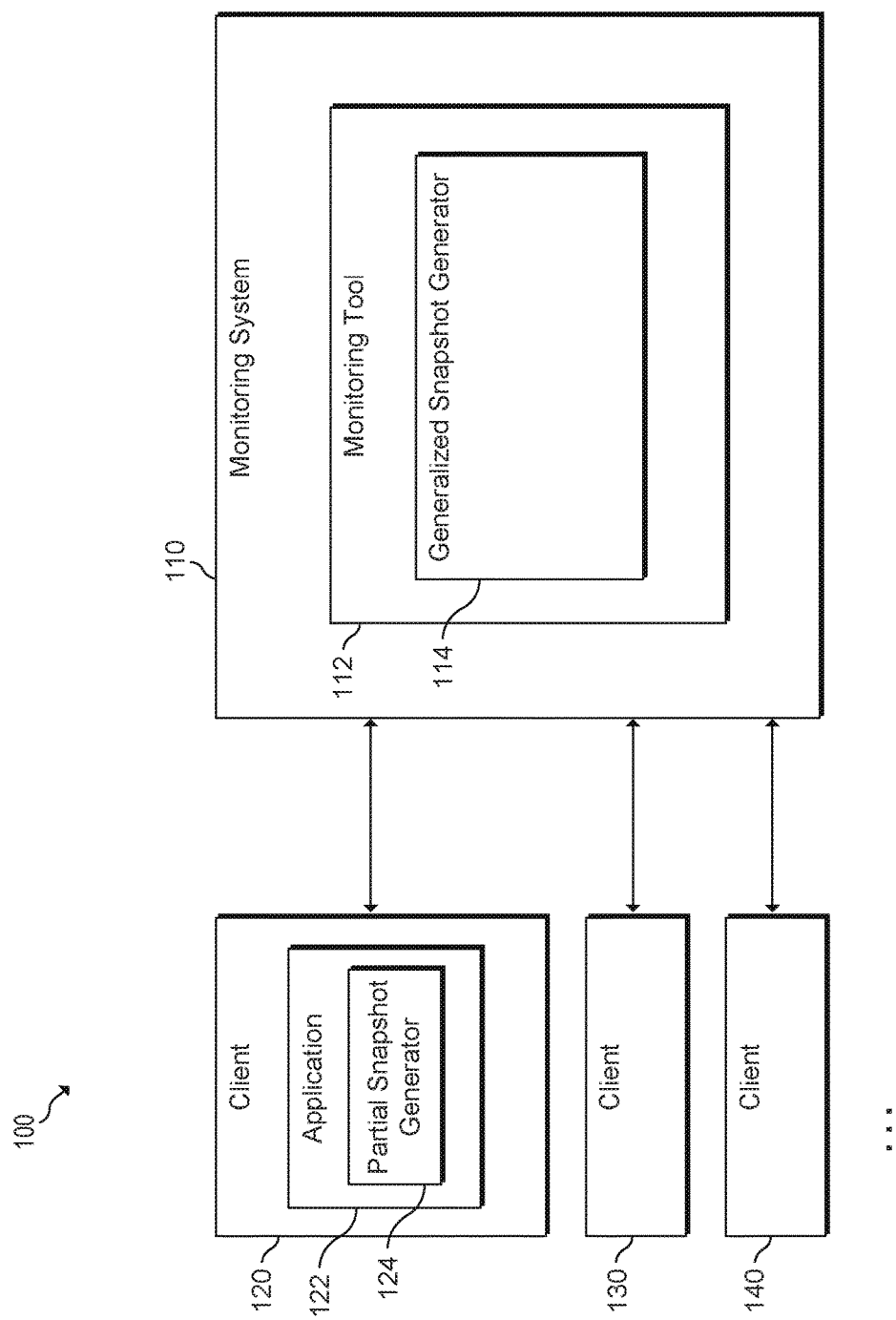
FIG. 1 is a block diagram of an example computing environment in which generalized snapshots based on multiple partial snapshots may be useful.

Snapshots may be useful for testing an application. For example, a testing tool may capture or record a certain flow of an application (e.g., a series of user actions such as button clicks, etc.) such that the flow can be analyzed. It may be useful for various steps of such a flow to include at least one snapshot, for example, to add application context to a textual description of the step or action. Adding application context via snapshots may allow a user (e.g., a developer or debugger) to better and more quickly understand a performance incident or error. However, when snapshots originate from applications being used by real users, it may be desirable to maintain the users' privacy.

Some pre-production testing tools (e.g., tools that test an application before it is released to real users) may capture screen shots and attach them to a report of the text execution. Because, in these situations, the application is not being used by real users, the application does not contain any personal information that needs to be protected. Such applications may use fake or test information instead of real user information. As such, for each test step or simulated user action, a single screen shot may be attached. These tools do not create generalized snapshots based on multiple partial snapshots.

Some production testing tools, or monitoring tools, may also capture screen shots and attach them to a report of the text execution. For example, synthetic monitoring tools may periodically check the status an application (e.g., whether the application is online, available, running, etc.). Additionally, some synthetic monitoring tools may check general functionalities of an application that do not require a user login. Additionally, some synthetic monitoring tools may check functionalities of an application that do require a user login by using a test account instead of a real user account. In all of these situations, no real user information is needed for the testing. As such, for each test step or simulated user action, a single screen shot may be attached. These tools do not create generalized snapshots based on multiple partial snapshots.

Some other production testing tools, such as real user monitoring tools, may capture screen shots that are associated with real user actions as real users use the application. In these situations, the snapshots may contain sensitive or private information of the users. For example, a snapshot could include a user's mailing address, account number, credit card information or the like. This may pose a privacy concern for many users, as the users may not trust the developers or debuggers that are using the snapshots. Thus, it may be desirable for real user monitoring tools to use snapshot information while maintaining users' privacy. It may be desirable to create a generalized or scrubbed snapshot that testers or debuggers can use without seeing any sensitive real user information.

The present disclosure describes generalized snapshots based on multiple partial snapshots. In some examples, a monitoring tool may receive and/or access multiple partial snapshots, each from a different client. Each client may be in use by a real user running an application. Each partial snapshot may capture a portion of the total pixels included in a screen or view associated with a user interface of the application. The monitoring tool may create a generalized snapshot from the multiple partial snapshots. The color of each of the pixels of the generalized snapshot may be determined by considering the colors of the pixels from the multiple partial snapshots that are in the same X-Y location as the pixel of the generalized snapshot. The resulting generalized snapshot may be a "generic" or "most representative" (but scrubbed) snapshot based on the screen of multiple real users. The generalized snapshot may preserve the users' privacy by not sending confidential/personal information over a network to the monitoring system.

FIG. 1 is a block diagram of an example computing environment 100 in which generalized snapshots based on multiple partial snapshots may be useful. Computing environment 100 may include a monitoring system 110 and a number of clients (e.g., 120, 130, 140, etc.). Each client may provide, e.g., at a particular time or in response to a particular event, a partial snapshot to monitoring system 110. Each partial snapshot may be an image file, digital file or some other type of binary data that includes a number of color pixels. The clients may provide the partial snapshots to the monitoring system 110 over at least one network. Such a network may be any wired or wireless network, and may include any number of hubs, routers, switches, cell towers or the like. Such a network may be, for example, part of a cellular network, part of the internet, part of an intranet and/or other type of network. Monitoring system 110 may receive, e.g., at particular times or in response to particular events, the multiple partial snapshots from the various clients (e.g., 120, 130, 140, etc.) and may create a generalized snapshot based on these multiple partial snapshots.

Client 120 may be any type of computing device that is capable of creating partial snapshots and transmitting them, e.g., over a network, to monitoring system 110. Client 120 may be, for example, a smartphone, cell phone, tablet, phablet, laptop, desktop, server, application-specific computing device or any other type of computing device. Client 120 may be described specifically herein, but it should be understood that clients 130, 140 and any other clients in computing environment 100 may be similar to client 120 as described herein. Client 120 may include an application 122 that runs on the client 120. Application 122 may include instructions (e.g., stored on a machine-readable storage medium of client 120) that, when executed (e.g., by a processor of client 120), implement the functionality of the application. Alternatively or in addition, application 122 may include electronic circuitry (i.e., hardware) that implements the functionality of the application. Application 122 may be any type of application, for example, a software program, web browser, web application, mobile application or the like.

Client 120 may include a partial snapshot generator 124. Partial snapshot generator 124 may be included as part of application 122 or may be independent of (e.g., in communication with) application 122. Partial snapshot generator may, at various times and/or in response to various events (e.g., user actions, times, etc.), create a partial snapshot. The partial snapshot may capture a portion of a screen or view displayed by a user interface (UI) component of application 122. Partial snapshot generator 124 may, for a particular partial snapshot, select which pixels of the total available UI screen or view are to be included in the partial snapshot, and may capture these pixels. The captured pixels are a portion of the total pixels included in the screen or view. For example, for a screen of size W*H, partial snapshot generator 124 may capture k (e.g., some percentage or other portion of the total pixels) pixels. Partial snapshot generator 124 may maintain a dispersion of the captured pixels over the total area of the screen or view and may prevent clustering of captured pixels within sub-areas of the total area. Partial snapshot generator 124 may capture enough pixels over the total area of the screen or view such that a generalized version of the screen or view can be reconstructed (e.g., by monitoring system 110) in conjunction with multiple other similarly categorized partial snapshots. Partial snapshot generator 124 may also prevent clustering of pixels in areas which may allow personal user information or confidential information in the screen or view to be deciphered by looking at the particular partial snapshot. A goal may be to include a small enough amount of data such that the included image data cannot be extrapolated. At the same time, including more data in each partial snapshot may allow for quicker creating of generalized snapshots.

Partial snapshot generator 124 may provide the partial snapshots to the monitoring system 110 over at least one network. Other clients (e.g., 130, 140, etc.) may also provide partial snapshots to the monitoring system 110 such that the monitoring system 110 may use multiple partial snapshots to create a generalized snapshot.

Monitoring system 110 may include at least one computing device that is capable of receiving multiple partial snapshots from the various clients (e.g., 120, 130, 140, etc.) and creating a generalized snapshot. The term "system" may be used to refer to a single computing device or multiple computing devices that communicate with each other (e.g., via a network) and operate together to provide a service. Monitoring system 110 may include a monitoring tool 112 that runs on monitoring system 110.

Monitoring tool 112 may be any type of application testing tool (e.g., a real user monitoring tool) that receives execution information (e.g., execution reports, errors, performance issues, etc.) from various applications (e.g., 122) running on various clients (e.g., 120, 130, 140, eta). Monitoring tool 112 may also be capable of receiving snapshots and/or partial snapshots that may be attached to or included as part of the received execution information. Monitoring tool 112 may include instructions (e.g., stored on a machine-readable storage medium of system 110) that, when executed (e.g., by a processor of system 110), implement the functionality of the monitoring tool 112. Alternatively or in addition, monitoring tool 112 may include electronic circuitry (i.e., hardware) that implements the functionality of the monitoring tool 112. Monitoring system 110 may include a generalized snapshot generator 114. Generalized snapshot generator 114 may be included as part of monitoring tool 112 or may be independent of (e.g., in communication with) monitoring tool 112.

Generalized snapshot generator 114 may receive multiple partial snapshots from the various clients (e.g., 120, 130, 140, etc.). In particular, generalized snapshot generator 114 may receive partial snapshots from partial snapshot generators (e.g., 124) running on the various clients. The partial snapshot generators may classify each partial snapshot that is created or about to be created according to at least one classification scheme. For example, partial snapshots may be classified according to particular UI screens, screen views (e.g., particular buttons, windows, etc.), timestamps or time events, user actions, sensor data, other events or the like. Partial snapshots may be classified, for example, by the particular screen or view they capture and/or by the event that caused the partial snapshot to be created. Such classification information for a particular partial snapshot may be referred to as metadata, and may be sent to the monitoring system (e.g., 110) along with the partial snapshot. The partial snapshot generators may indicate the classification and/or metadata in various ways. For example, each classification may be associated with a particular unique identifier (ID).

Generalized snapshot generator 114 may create a generalized snapshot based on these multiple partial snapshots. More details regarding the generalized snapshot generator may be provided below with regard to the description of generalized snapshot generator 200 of FIG. 2.

Figure 2:
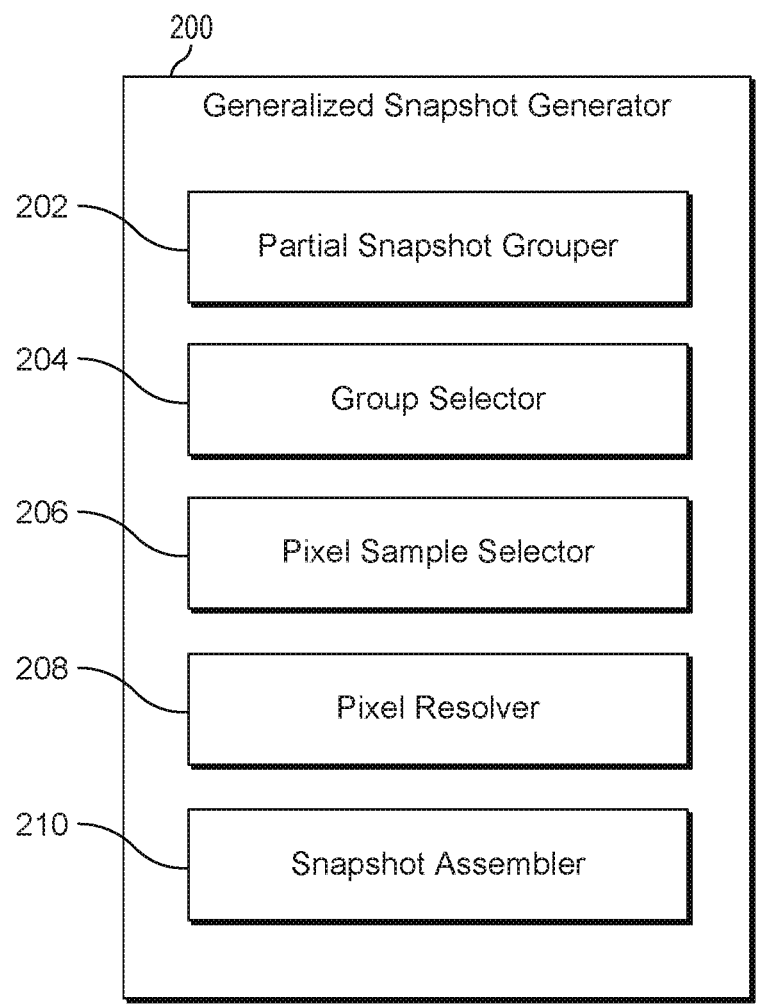
FIG. 2 is a block diagram of an example generalized snapshot generator for generalized snapshots based on multiple partial snapshots.

FIG. 2 is a block diagram of an example generalized snapshot generator 200, which may be similar to generalized snapshot generator 114 of FIG. 1. Generalized snapshot generator 200 may include a partial snapshot grouper 202, a group selector 204, a pixel sample selector 206, a pixel resolver 208 and a snapshot assembler 210. Each of these components and generalized snapshot generator 200 overall may each include instructions (e.g., stored on a machine-readable storage medium of monitoring system 110) that, when executed (e.g., by a processor of monitoring system 110), implement the functionality of the particular component. Alternatively or in addition, each of these components and generalized snapshot generator 200 overall may include electronic circuitry (i.e., hardware) that implements the functionality of the particular component.

Partial snapshot grouper 202 may receive and/or access partial snapshots from various clients (e.g., clients 120, 130, 140, etc. of FIG. 1). Clients may send partial snapshots to generalized snapshot generator 200 at particular times, in response to particular events or the like, as described in more detail above. Additionally, clients may send, and partial snapshot grouper 202 may receive and/or access, metadata related to each partial snapshot. As described above, the metadata for each partial snapshot may indicate at least one classification for the partial snapshot. For example, partial snapshots may be classified according to particular UI screens, screen views, timestamps, user actions, events or the like. Partial snapshot grouper 202 may group received and/or accessed partial snapshots according to such classifications. For example, all partial snapshots related to a screen view of a particular button (e.g., a "Checkout" button) may be grouped together. As another example, all partial snapshots related to a UI screen for an application with regard to a particular timestamp may be grouped together. Partial snapshot grouper 202 may perform such groupings such that multiple partial snapshots related to a particular situation may be resolved to form a single generalized snapshot. Partial snapshot grouper 202 may also receive, as part of the metadata from the various clients, screen resolution information, which may be used as described in more detail below.

Group selector 204 may select a particular group or classification (as described above) of partial snapshots to be used to create a generalized snapshot. For example, a monitoring tool (e.g., 112 of FIG. 1) may determine that a snapshot related to a particular UI screen view is desired. In response, group selector 204 may select all the partial screen shots for that particular group or classification.

Pixel sample selector 206 may determine, for each generalized snapshot to be created, the number and identity of source pixels that are to be used to determine each target pixel. The term "target pixel" may be used to refer to a pixel in the generalized snapshot, including pixel color information and pixel location information (e.g., X and Y coordinates over the total area of the generalized snapshot). The term "source pixel" may be used to refer to a pixel in a partial snapshot, including pixel color information and pixel location information (e.g., X and Y coordinates over the total area of the generalized snapshot). Source pixel location information may be in relation to a total number of pixels (i.e., total area) included in the generalized snapshot, for example, as opposed to a condensed area associated with the partial snapshot. As described above, some partial snapshots may be condensed into smaller files because much of the pixel information may be unavailable for the particular partial snapshots.

As described above, each partial snapshot may include a number of color pixels. Likewise, each generalized snapshot that is created includes a number of color pixels. A generalized snapshot may include (once it is created) a fully populated grid of pixels, for example, such that the generalized snapshot resembles a full UI screen or view (e.g., in the format of an image file). By contrast, as explained above, each partial snapshot includes only a portion of the total number of pixels included in the generalized snapshot (e.g., a dispersion of random or semi-random pixels). Additionally, various partial snapshots may include different portions of pixels. Thus, when considering an entire group of partial snapshots available to create a particular generalized snapshot, for each pixel of the generalized snapshot (e.g., for a particular pixel location), only a subset of the partial snapshots in the group may have a color value for that pixel. In other words, for each pixel (i.e., target pixel) of the generalized snapshot, there is a set of source pixels (each from a different partial snapshot) that are available for consideration. Pixel sample selector 206 may determine or maintain these sets. In some situations, pixel sample selector 206 may prune this set if the number of pixels to be considered becomes too large. For example, only the X most recently received source pixels for that particular target pixel may be considered. Other pruning approaches may be used as well.

Pixel resolver 208 may determine (i.e., resolve), for each target pixel of the generalized snapshot, a final target pixel (i.e., a color value). For example, once group selector 204 selects a group of partial snapshots to be used to create a generalized snapshot, and once pixel selector 206 determines a set of source pixels (from the partial snapshots in the group) to be considered for each target pixel, pixel resolver 208 may proceed. Pixel resolver 208 may determine each target pixel (e.g., for a particular pixel location of the generalized snapshot) by considering the set of source pixels determined by pixel sample selector 206. For simplicity, the following descriptions may describe various examples of how a single target pixel of a generalized snapshot may be determined. It should be understood, however, that the other target pixels may be determined in a similar manner.

For a particular target pixel of the generalized snapshot, pixel resolver 208 may determine a color value based on the color values of the relevant set of source pixels from the partial snapshots. Various approaches for resolving multiple color values into a single color value may be used, and the following will describe some examples. Pixel resolver 208 may use a largest subgroup approach. In these examples, pixel resolver 208 may, for the particular target pixel, group (i.e., into subgroups) all the relevant source pixels according to their color values. Pixel resolver 208 may then determine the largest subgroup, i.e., the color value subgroup with the most source pixels. Pixel resolver 208 may select the color value of this largest subgroup to represent the target pixel in the generalized snapshot. This largest subgroup approach may be repeated for each pixel in the generalized snapshot.

Pixel resolver 208 may require that a subgroup be dominant in order for it to be used as a representative for a target pixel. This means that pixel resolver 208 may require that the number of pixels in a subgroup meet or exceed a certain threshold. Such a threshold may be a percentage of the pixels to be considered for that target pixel, or a particular difference between the number of pixels in the largest subgroup and the next subgroup, or some other threshold.

In the case that no largest or dominant subgroup can be determined (e.g., no subgroup clearly has a dominant number of pixels), pixel resolver 208 may determine the color value of that pixel in a different manner. This situation may arise, for example, when an application contains an image and the image is often different (e.g., a product image on a shopping website). In these situations, pixel resolver 208 may determine the color value by using a pre-defined constant color value, for example, to create part of a solid color (e.g., black) area over a portion of the generalized snapshot, or to create part of a placeholder image (e.g., for larger, well defined rectangular areas) over a portion of the generalized snapshot. Alternatively, pixel resolver 208 may use other approaches to determine the color value of a pixel when there is no dominant subgroup.

As an alternative approach to resolving multiple color values into a single color value for each pixel, pixel resolver 208 may use an "average" approach. An average approach, for a particular target pixel, may determine a color value that is an average of the relevant source pixels. Alternatively, pixel resolver 208 may use a "median" approach. A median approach, for a particular target pixel, may determine a color value that is in the middle of the distribution of relevant source pixels. Various other approaches for resolving multiple color values into a single color value may be used as well.

Pixel resolver 208 may determine (i.e., resolve) each target pixel (based on the relevant source pixels) in a dynamic or on-the-fly manner. Thus, pixel resolver 208 may accommodate changes that occur over time in the source pixels, and such changes may be dynamically represented in generalized snapshot. As one example, it was mentioned above that pixel sample selector 206 may select the X most recently received source pixels for each target pixel. This selection "window" may "slide" over time as more source pixels are received. Thus, the set of source pixels that are used by pixel resolver 208 may change dynamically over time, and pixel resolver 208 may ensure that the generalized snapshot also dynamically changes over time accordingly.

Snapshot assembler 210 may create a generalized snapshot (e.g., for the group of partial snapshots selected by group selector 204). More particularly, snapshot assembler 210 may use target pixel determinations made by pixel resolver 208. Snapshot assembler 210 may assemble these target pixel determinations into a full snapshot, e.g., an image file, digital file or some other type of binary data that includes a number of color pixels. Snapshot assembler 210 may, for example, use location information (e.g., X and Y coordinates) of the various target pixels to place the target pixels in the right location in the generalized snapshot.

Because of the approach used by pixel resolver 208 to resolve multiple color values into a single color value for each target pixel, the generalized snapshot created by the snapshot assembler 210 will have particular properties. For example, for a particular snapshot group (e.g., for a particular UI view), portions of the screen that are common to all source screens (e.g., static parts of a webpage) will appear unchanged in the generalized snapshot. However, portions of the screen that are related to changing elements across various users (e.g., personal user information, location-specific content, etc.) will be generalized or scrubbed in the generalized snapshot. For example, location-specific images may appear scrambled or blurry. For example, personal user text may appear obfuscated or cryptic. One example benefit of the approaches described herein is that a dominant language used in the partial snapshots may automatically appear in the generalized snapshot. For example, as a byproduct of the largest subgroup pixel resolver approach (or other used pixel resolver approach), pixels of static text in the partial snapshots will result in the dominant language being recreated in the generalized snapshot. Then, for personal or changing text, the text may appear obfuscated or cryptic.

Snapshot assembler 210 may maintain each generalized snapshot (e.g., for the group of partial snapshots selected by group selector 204) in a dynamic or on-the-fly manner. As described above, pixel resolver 208 may determine (i.e., resolve) each target pixel in a dynamic or on-the-fly manner. Then, snapshot assembler 210 may update the generalized snapshot when the final target pixels of the generalized snapshot change. Thus, snapshot assembler 210 may ensure that the generalized snapshot dynamically changes over time as the partial snapshots change. This may be useful, for example, when new versions of an application are release at various times. When new versions of an application are released, the partial screen shots may change, and thus the generalized snapshot will update automatically and dynamically.

In some examples, the grouping, pixel selecting, pixel resolving and/or snapshot assembling approaches described herein may consider the screen resolution of the UI screens displayed to users. For example, for different screen resolutions, partial snapshot grouper 202 may group partial snapshots differently depending on the screen resolution. As another example, components 204, 206, 208 and/or 210 may execute separately for each screen resolution. Thus, snapshot assembler 210 may output multiple generalized snapshots (e.g., one for each screen resolution) even though the pixels of the source partial snapshots may have been sampled from the same type of UI screen or view. In these examples, the classification or metadata information associated with various partial screen shots may indicate screen resolution. Specifically, when clients send partial snapshots to the monitoring system, the accompanying metadata may include the screen resolution of the client device (e.g., 120), and/or of the application (e.g., 122). In other examples, the grouping, pixel selecting, pixel resolving and/or snapshot assembling approaches described herein may accommodate different screen resolutions and may not create different generalized snapshots just because of different screen resolutions.

Figure 3:
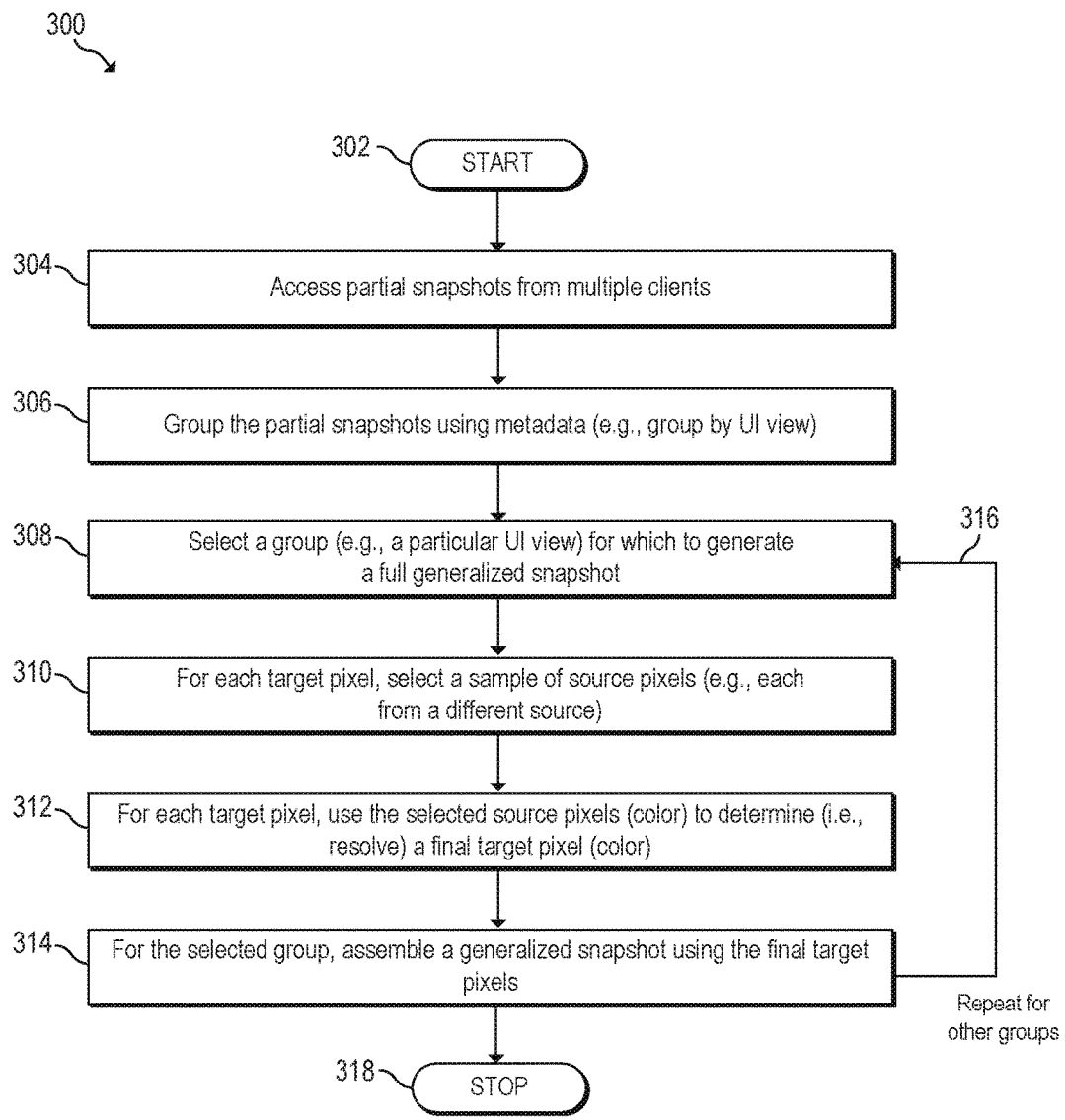
FIG. 3 is a flowchart of an example method for generalized snapshots based on multiple partial snapshots.

FIG. 3 is a flowchart of an example method 300 for generalized snapshots based on multiple partial snapshots. Method 300 may be described below as being executed or performed by a system, for example, monitoring system 110 of FIG. 1. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where a system (e.g., 110) may access partial snapshots from multiple clients (e.g., 120, 130, 140, etc.). At step 306, the system may group the partial snapshots using metadata (e.g., to group them by UI screen, view, etc.). More details about this grouping are provided above with regard to partial snapshot grouper 202. At step 308, the system may select a group (e.g., a particular UI screen, view, etc.) for which to generate a full generalized snapshot. More details about this group selection are provided above with regard to group selector 204. At step 310, the system may, for each target pixel, select a sample of source pixels (e.g., each from a different source). More details about this pixel sample selection are provided above with regard to pixel sample selector 206. At step 312, the system may, for each target pixel, use the selected source pixels (e.g., their color value) to determine (i.e., resolve) a final target pixel (e.g., a final color value). More details about this pixel resolving are provided above with regard to pixel resolver 208. At step 314, for the selected group, the system may assemble a generalized snapshot using the final target pixels. More details about this snapshot assembly are provided above with regard to snapshot assembler 210. Method 300 may repeat various steps of the method (e.g., steps 308, 310, 312, 314) for other groups of partial snapshots, as is generally indicated by line 316 of FIG. 3. Method 300 may eventually continue to step 318, where method 300 may stop.

Figure 4:
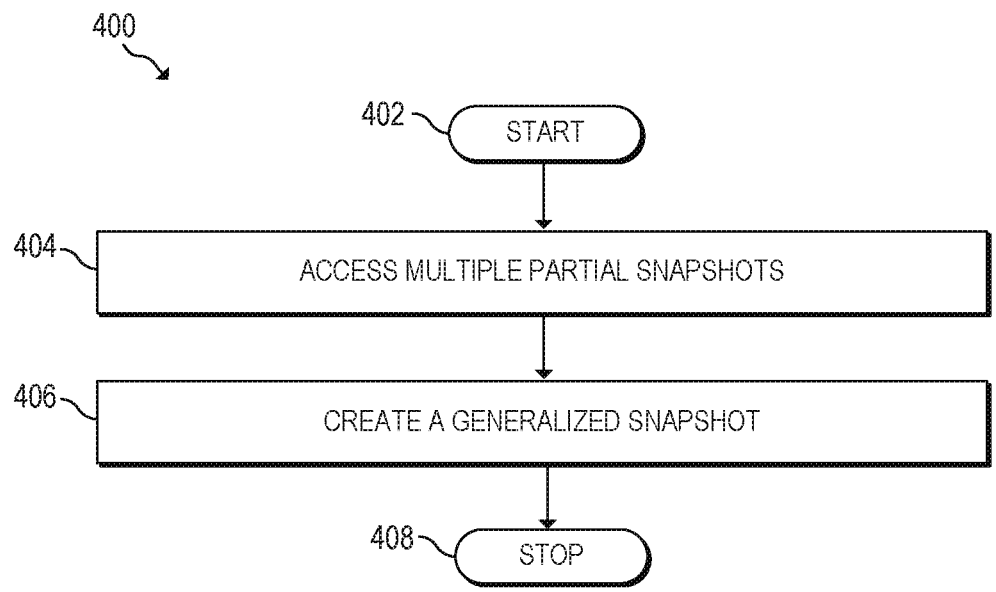
FIG. 4 is a flowchart of an example method for generalized snapshots based on multiple partial snapshots.

FIG. 4 is a flowchart of an example method 400 for generalized snapshots based on multiple partial snapshots. Method 400 may be described below as being executed or performed by a system, for example, system 500 of FIG. 5, or system 600 of FIG. 6. Other suitable systems and/or computing devices may be used as well. Method 400 may be implemented in the form of executable instructions stored on at least one machine-readable storage medium of the system and executed by at least one processor of the system. Alternatively or in addition, method 400 may be implemented in the form of electronic circuitry (e.g., hardware). In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a system (e.g., 500 or 600) may access multiple partial snapshots, each from a different client. At step 406, the system may create a generalized snapshot from the multiple partial snapshots. The generalized snapshot may include multiple target pixels, and the color of each of the multiple target pixels may be determined by considering colors of multiple source pixels, each from a different partial snapshot. Method 400 may eventually continue to step 408, where method 400 may stop.

Figure 5:
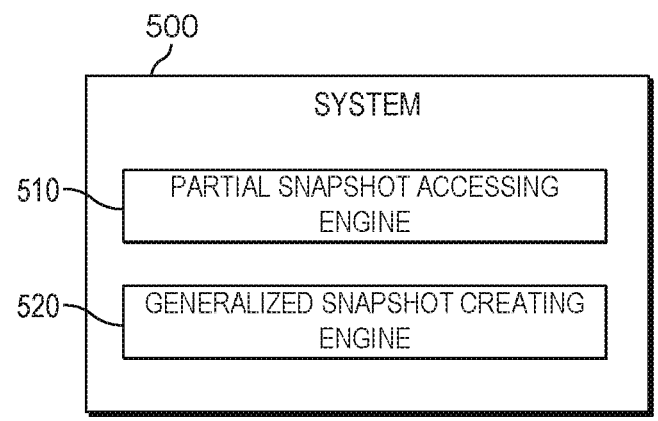
FIG. 5 is a block diagram of an example system for generalized snapshots based on multiple partial snapshots.

FIG. 5 is a block diagram of an example system 500 for generalized snapshots based on multiple partial snapshots. System 500 may be similar to system 110 of FIG. 1. System 500 may include any number of computing devices, e.g., a single computing device or multiple computing devices that are capable of communicating with each other over a network. In the embodiment of FIG. 5, system 500 includes a partial snapshot accessing engine 510 and a generalized snapshot creating engine 520. Partial snapshot accessing engine 510 may access multiple partial snapshots, e.g., in a manner similar to partial snapshot grouper 202 of FIG. 2 and perhaps other components of generalized snapshot generator 200. Each partial snapshot may be from a different client. Each partial snapshot may capture a portion of the total pixels included in a screen or view associated with an application user interface. Partial snapshot accessing engine 510 may be implemented in the form of executable instructions stored on at least one machine-readable storage medium of system 500 and executed by at least one processor of system 500. Alternatively or in addition, partial snapshot accessing engine 510 may be implemented in the form of one or more hardware devices including electronic circuitry for implementing the functionality of partial snapshot accessing engine 510.

Generalized snapshot creating engine 520 may create a generalized snapshot from the multiple partial snapshots, e.g., in a manner similar to pixel resolver 208, snapshot assembler 210 of FIG. 2 and perhaps other components of generalized snapshot generator 200. The generalized snapshot includes multiple target pixels, and the color of each of the multiple target pixels may be determined by considering colors of multiple source pixels, each from a different partial snapshot. Generalized snapshot creating engine 520 may be implemented in the form of executable instructions stored on at least one machine-readable storage medium of system 500 and executed by at least one processor of system 500. Alternatively or in addition, generalized snapshot creating engine 520 may be implemented in the form of one or more hardware devices including electronic circuitry for implementing the functionality of generalized snapshot creating engine 520.

Figure 6:
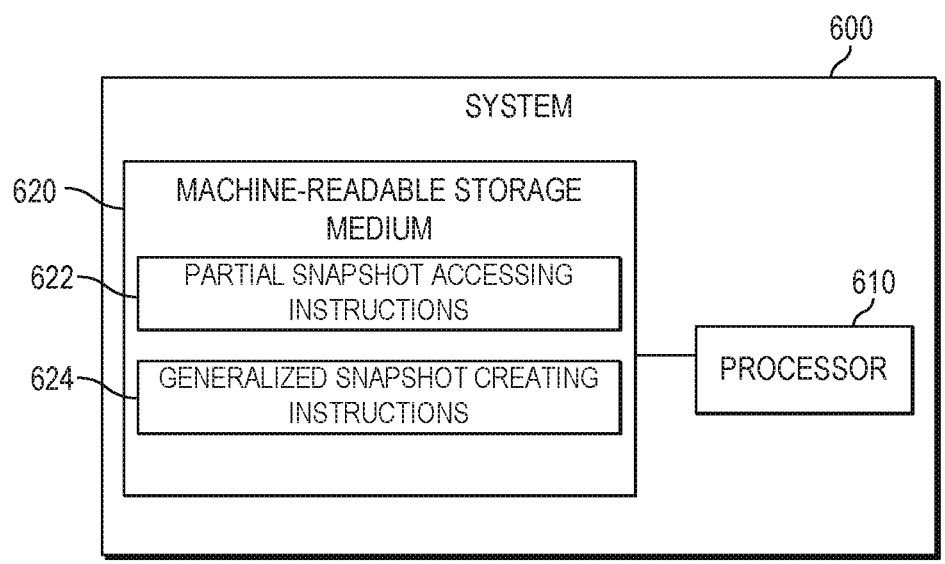
FIG. 6 is a block diagram of an example system for generalized snapshots based on multiple partial snapshots.

FIG. 6 is a block diagram of an example system 600 for generalized snapshots based on multiple partial snapshots. System 600 may be similar to system 110 of FIG. 1. System 600 may include any number of computing devices, e.g., a single computing device or multiple computing devices that are capable of communicating with each other over a network. In the embodiment of FIG. 6, system 600 includes a processor 610 and a machine-readable storage medium 620. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624 to create generalized snapshots based on multiple partial snapshots. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions for generalized snapshots based on multiple partial snapshots.

Referring to FIG. 6, partial snapshot accessing instructions 622, when executed by a processor (e.g., 610), may cause system 600 to access multiple partial snapshots, each from a different client. Generalized snapshot creating instructions 624, when executed by a processor (e.g., 610), may cause system 600 to create a generalized snapshot from the multiple partial snapshots. The generalized snapshot includes multiple target pixels, and the color of each of the multiple target pixels may be determined by considering colors of multiple source pixels, each from a different partial snapshot.

The invention claimed is:

1. A method for creating a generalized snapshot, the method comprising:
   accessing multiple partial snapshots, each from a different client; and
   creating a generalized snapshot including multiple target pixels from the multiple partial snapshots,
      wherein the generalized snapshot and the multiple partial snapshots each relate to a particular classification, and the particular classification is indicated by associated metadata; and
      wherein a color of each of the multiple target pixels is determined using colors of a set of multiple source pixels of a plurality of sets, each set from a different partial snapshot, and by considering each distinct source pixel color as a member of a subgroup and selecting the subgroup with a largest number of source pixels.

2. The method of claim 1, wherein for each of the multiple target pixels, a subset of the considered set of multiple source pixels are each associated with a similar X-Y pixel location as the target pixel.

3. The method of claim 1, wherein the generalized snapshot and the multiple partial snapshots have a same width-height ratio, and wherein for each of the multiple target pixels, a subset of the considered set of multiple source pixels are associated with a same X-Y coordinates as the target pixel.

4. The method of claim 1, wherein each partial snapshot captures a portion of the total pixels included in a screen or view associated with an application user interface, and wherein, for each partial snapshot, the captured portion is different when compared to portions captured by other of the multiple partial snapshots.

5. The method of claim 1, wherein the classification is one or more of the following:
   a particular user interface screen;
   a particular user interface screen view;
   a particular clock time or timestamp; and
   a particular user action related to an application user interface.

6. The method of claim 1, wherein for each target pixel, when no dominant subgroup exists, selecting a pre-determined color for the target pixel.

7. The method of claim 1, wherein the creating of the generalized snapshot from the multiple partial snapshots occurs dynamically such that the generalized snapshot updates whenever more partial snapshots are received or accessible.

8. A system for creating a generalized snapshot, the system comprising:
   a processor executing:
      a partial snapshot accessing engine that accesses multiple partial snapshots, each from a different client, wherein each partial snapshot captures a portion of the total pixels included in a screen or view associated with an application user interface; and
      a generalized snapshot creating engine that creates a generalized snapshot including multiple target pixels from the multiple partial snapshots,
         wherein the generalized snapshot and the multiple partial snapshots each relate to a particular classification, and the particular classification is indicated by associated metadata; and
         wherein a color of each of the multiple target pixels is determined using colors of a set of multiple source pixels of a plurality of sets, each set from a different partial snapshot, by considering each distinct source pixel color as a member of a subgroup and selecting the subgroup with a largest number of source pixels.

9. The system of claim 8, wherein for each of the multiple target pixels, a subset of the considered set of multiple source pixels are each associated with a similar X-Y pixel location as the target pixel.

10. A non-transitory machine-readable storage medium encoded with instructions for creating a generalized snapshot, the instructions executable by a processor of a system to cause the system to:
   access multiple partial snapshots, each from a different client; and
   create a generalized snapshot including multiple target pixels from the multiple partial snapshots,
      wherein the generalized snapshot and the multiple partial snapshots each relate to a particular classification, and the particular classification is indicated by associated metadata; and
      wherein a color of each of the multiple target pixels is determined using colors of a set of multiple source pixels of a plurality of sets, each set from a different partial snapshot, and by considering each distinct source pixel color as a member of a subgroup and selecting the subgroup with a largest number of source pixels.

11. The non-transitory machine-readable storage medium of claim 10, wherein the creation of the generalized snapshot from the multiple partial snapshots occurs dynamically such that the generalized snapshot updates whenever more partial snapshots are received or accessible.

* * * * *